United States Patent Office 3,396,159
Patented Aug. 6, 1968

3,396,159
PENICILLIN AND CEPHALOSPORIN DERIVATIVES
Jack Bernstein and Henrietta M. Engel, New Brunswick, N.J., assignors, by mesne assignments, to E. R. Squibb & Sons., Inc., New York, N.Y., a corporation of Delaware
No Drawing. Filed June 15, 1965, Ser. No. 464,194
12 Claims. (Cl. 260—239.1)

ABSTRACT OF THE DISCLOSURE

Compounds of the formula

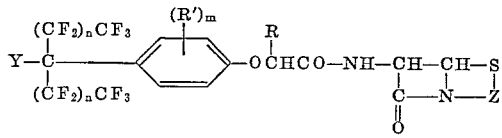

wherein R is hydrogen or lower alkyl, R' is lower alkyl, Y is hydrogen, hydroxy or halogen, m and n are zero, one or two, and Z is one of the radicals

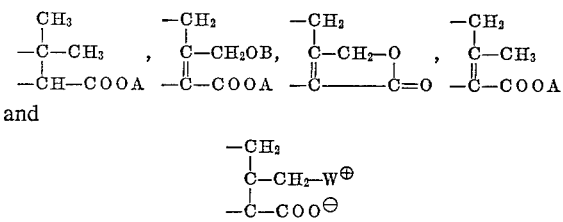

and

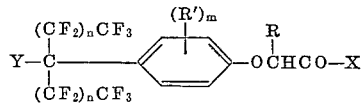

wherein A is hydrogen or a pharmaceutically acceptable cation, B is hydrogen, lower alkanoyl, benzoyl or phenyl(lower alkanoyl), and W is a quaternary amine, are prepared by interacting a compound of the formula

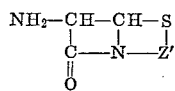

wherein R, R', Y, m and n are as above defined and CO—X is an acylating group, with a compound of the formula $$NH_2-CH-CH-S$$
$$\phantom{NH_2-}C\phantom{-CH-}N-Z'$$
$$\phantom{NH_2-}\|$$
$$\phantom{NH_2-}O$$

wherein Z' is the same as Z, except for the quaternary amine alternative. The quaternary amines are formed by reacting the corresponding compounds, wherein Z contains an acyloxy group, with a tertiary amine. The compounds possess antibacterial activity.

---

This invention relates to new chemical compounds, and more particularly to new compounds of the Formula I:

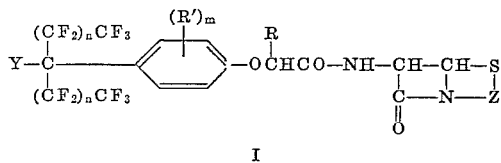

wherein R is hydrogen or lower alkyl, R' is lower alkyl, Y is hydrogen, hydroxy or halogen (preferably chloro and fluoro), m and n are zero, one or two, and Z is one of the radicals

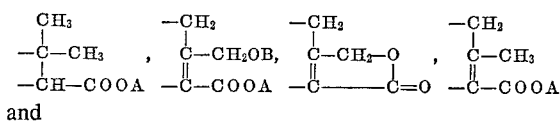

and

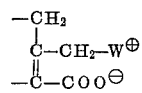

wherein A is hydrogen or a pharmaceutically acceptable cation, such as an amine and an alkali metal, B is hydrogen, lower alkanoyl, benzoyl or phenyl(lower alkanoyl), and W is a quaternary amine. The preferred compounds are those wherein R is hydrogen, Y is hydroxy or halogen, m is zero, n is zero, and Z is either of the first two radicals.

The new compounds of this invention are physiologically active substances that posses antibacterial activity, and hence may be used in lieu of known pencillins, for example, in the treatment of staphylococci infections, for which purpose they can be administered parenterally or perorally. In addition, the compounds of this invention have shown surprisingly high activity against the bacillus Calmette-Guerin (BCG); the compound of Example 1, for instance, displaying eight times greater activity than penicillin G against this microorganism.

The compounds of this invention are prepared by the process of this invention, which comprises interacting a compound of the Formula II:

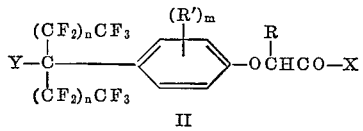

II wherein R, R', Y, m and n are as hereinbefore defined, and CO—X is an acylating group, such as an acyl halide, mixed anhydride, phenol ester, etc., with a compound of the Formula III:

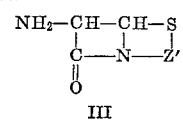

III wherein Z' is the same as Z but excludes the quaternary amine alternative; the reaction preferably being carried out in the presence of a basic condensation reagent, such as a tertiary amine (e.g., triethylamine).

Among the suitable compounds of Formula II may be mentioned the acyl chlorides and bromides of:

α-[α,α-bis(perfluoroalkyl)tolyloxy] (lower alkanoic) acids, such as
[α,α-bis(trifluoromethyl)-p-tolyloxy]acetic acid,
[α,α-bis(trifluoromethyl)-o-tolyloxy]acetic acid,
[α,α-bis(pentafluoroethyl)-p-tolyloxy]acetic acid,
[α-(trifluoromethyl)-α-(pentafluoroethyl)-p-tolyloxy] acetic acid,
α-[α,α-bis(trifluoromethyl)-p-tolyloxy]propionic acid, and
α-[α,α-bis(trifluoromethyl)-p-tolyloxy]-n-hexanoic acid;
α-[α-hydroxy-α,α-bis(perfluoroalkyl)tolyloxy](lower alkanoic) acids, such as
[α-hydroxy-α,α-bis(trifluoromethyl)-p-tolyloxy]acetic acid,

[α-hydroxy-α,α-bis(pentafluoroethyl)-p-tolyloxy]acetic acid,
[α-hydroxy-α,α-bis(heptafluoropropyl)-p-tolyloxy]acetic acid,
α-[α-hydroxy-α,α-bis(trifluoromethyl)-p-tolyloxy] propionic acid and
α-[α-hydroxy-α,α-bis(trifluoromethyl)-p-tolyloxy]-n-butanoic acid; and
α-[α-halo-α,α-bis(perhaloalkyl)tolyloxy](lower alkanoic) acids, such as
[α-chloro-α,α-bis(trifluoromethyl)-p-tolyloxy]acetic acid,
[α-fluoro-α,α-bis(trifluoromethyl)-p-tolyloxy]acetic acid,
[α-bromo-α,α-bis(trifluoromethyl)-p-tolyloxy]acetic acid,
[α-chloro-α,α-bis(trifluoromethyl)-o-tolyloxy]acetic acid,
[α-chloro-α,α-bis(pentafluoroethyl)-p-tolyloxy]acetic acid,
[α-fluoro-α,α-bis(heptafluoropropyl)-p-tolyloxy]acetic acid,
α-[α-fluoro-α,α-bis(trifluoromethyl)-p-tolyloxy]propionic acid, and
α-[α-chloro-α,α-bis(trifluoromethyl)-p-tolyloxy]enanthic acid.

These acids are prepared by conversion of the substituted aminobenzyl alcohols to the corresponding hydroxybenzyl alcohols, followed by reaction with an α-halo acid, as illustrated in Example 1.

Among the suitable compounds of Formula III may be mentioned: 6-aminopenicillanic acid and salts thereof, such as the alkali metal, alkaline earth metal, and amine salts thereof; 7-amino-3-hydroxymethyl-8-oxo-5-thia-1-azabicyclo[4,2,0]oct-2-ene-2-carboxylic acid, and the 3-acyl derivatives thereof, such as the 3-lower alkanoyls (e.g., acetyl, propionyl, butyryl, enanthyl and hexanoyl), 3-benzoyl and 3-phenyl(lower alkanoyls) (e.g., phenacetyl, β-phenylpropionyl and 6-phenylhexanoyl), as well as salts thereof; the lactone of 7-amino-3-hydroxymethyl-8 - oxo - 5 - thia - 1 - azabicyclo[4,2,0]oct - 2 - ene - 2-carboxylic acid; 7-amino-3-methyl-8-oxo-5-thia-1-azabicyclo[4,2,0]oct-2-ene-2-carboxylic acid and salts thereof. Those compounds wherein Z contains a quaternary amine are obtained by reacting a compound of Formula I, wherein Z contains an acyloxy group with a tertiary amine.

The following examples illustrate the invention (all temperatures being in centigrade):

EXAMPLE 1.—[α - HYDROXY-α,α-BIS(TRIFLUOROMETHYL) - p - TOLYLOXY]METHYL - PENICILLIN, POTASSIUM SALT (a) Preparation of p-amino-α,α-bis(trifluoromethyl) benzyl alcohol Ninety-three grams of aniline is heated to 170° and 175 grams of hexafluoroacetone is added over the period of two hours, while the mixture is stirred and maintained at 170–180°. After the addition is completed, the reaction mixture is heated for an additional thirty minutes and then allowed to cool. The crude product is dissolved in ether and the solution diluted with petroleum ether (30–60°) and allowed to cool. The desired product, p-amino-α,α-bis(trifluoromethyl)benzyl alcohol crystallizes and melts at about 148–150°, after washing with petroleum ether.

(b) Preparation of p-hydroxy-α,α-bis(trifluoromethyl) benzyl alcohol

A solution of 25 grams of p-amino-α,α-bis(trifluoromethyl)benzyl alcohol in 22 ml. of concentrated surfuric acid and 200 ml. of water is cooled to 0° and a solution of 6.9 grams of sodium nitrite in 18 ml. of water is added with vigorous stirring, while the temperature is maintained at 0–5°. The reaction mixture is stirred for an additional ten minutes after the addition of the sodium nitrite is complete, and then is added slowly to a hot (70°) solution of 65 ml. of concentrated sulfuric acid and 50 ml. of water. The reaction mixture is heated to boiling to complete the decomposition of the diazonium salt and is then cooled with stirring. The precipitated solid is collected by filtration and the filtrate extracted with ether. The ether extracts are dried over anhydrous sodium sulfate and then concentrated. The residue is combined with the previously obtained solid and sublimed at 70° at 0.08 mm. The slightly yellow solid is washed with 50 ml. of cold methylene chloride to yield the desired p-hydroxy-α,α-bis(trifluoromethyl)benzyl alcohol, melting at about 122.5–123.5°.

(c) Preparation of 2-[α-hydroxy-α,α-bis(trifluoromethyl)-p-tolyloxy]acetic acid

A solution of 11.8 grams of p-hydroxy-α,α-bis(trifluoromethyl)benzyl alcohol and 6.34 grams of bromoacetic acid in 75 ml. of water to which has been added 9.1 ml. of 40% sodium hydroxide solution is heated under reflux for forty-two hours. The reaction mixture is then cooled and acidified to pH 2 with concentrated hydrochloric acid. The aqueous mixture, containing some precipitated solid, is extracted with ether. The ether extracts are then combined and shaken with 5% aqueous sodium carbonate. The aqueous layer is separated, acidified to pH 2 with concentrated hydrochloric acid and extracted with ether. The ether extracts are dried and concentrated to leave a residual oil which crystallizes upon the addition of boiling heptane and cooling. The solid is filtered and recrystallized from benzene to yield the desired 2-[α-hydroxy-α,α-bis(trifluoromethyl)-p-tolyloxy]acetic acid, melting at about 127–127.5°.

(d) Preparation of [[α-hydroxy-α,α,-bis(trifluoromethyl-p-tolyloxy]methyl] penicillin, potassium salt To a mixture of 11 ml. of anhydrous dioxane and 3 ml. of anhydrous acetone there is added 1.59 grams of 2 - [α-hydroxy-α,α-bis(trifluoromethyl)-p-tolyoxy] acetic acid and 0.7 ml. of triethylamine. The mixture is cooled to 10° and 0.6 ml. of ethyl chloroformate is added dropwise with vigorous stirring. The reaction mixture is allowed to warm to room temperature and an additional 40 ml. of anhydrous dioxane added, followed by a solution of 1.0 gram of 6-aminopenicillanic acid and 0.7 ml. of triethylamine in five ml. of water. The reaction mixture is then cooled to 5° and allowed to stand for 16 hours. The reaction mixture is allowed to warm to room temperature and, after the addition of 0.42 g. of sodium bicarbonate, is diluted with 30 ml. of cold water. After extraction with ether, the aqueous layer is acidified to pH 1.5 with 40% sulfuric acid, the oil that separates being extracted with ether which is present during the acidification. The ether extracts are combined, washed with cold water and dried over anhydrous sodium sulfate. To the dried ether solution there is added 1.82 grams of a 50% solution of potassium 2-ethylhexanoate in n-butanol. The addition of 50 ml. of anhydrous acetone causes the oil to precipitate as an amorphous solid. The solid is recovered by centrifugation, suspended in anhydrous ether and filtered. The crude potassium salt is purified by trituration with a small amount of anhydrous methanol and with isopropyl ether. The[[α-hydroxy-α,α-bis(trifluoromethyl) - p-tolyloxy]methyl]penicillin, potassium salt melts at about 223–224° with decomposition after preliminary sintering at about 205°.

EXAMPLE 2.—7 - [2 - [α-CHLORO-α,α-BIS(TRIFLUOROMETHYL) - p - TOLYOXY]ACETAMIDO]-3-(ACETOXYMETHYL) - 8 - OXO-5-THIA-1-AZABICYCLO[4,2,0]OCT - 2 - ENE-2 - CARBOXYLIC ACID, SODIUM SALT (a) Preparation of 2-[α,chloro-α,α-bis(trifluoromethyl)-p-tolyoxy]acetyl chloride A mixture of 10 grams of 2-[α-hydroxy-α,α-bis(trifluoromethyl)-p-tolyloxy]acetic acid and 20 ml. of thionyl chloride is heated under reflux for thirty minutes. The excess thionyl chloride is removed by distillation under reduced pressure Ten ml. of anhydrous benzene is added to the residue and the solvent is removed by distillation under reduced pressure. The residue, 2-[α-chloro-α,α-bis-(trifluoromethyl)-p-tolyoxy]acetyl chloride, is used without further purification.

(b) Preparation of 7 - [2 - [a-chloro-α,α-bis(trifluoromethyl)-p-tolyoxy]acetamido] - 3 - (acetoxymethyl)-8-oxo- - 5 - thia-1-azabicyclo[4,2,0]oct-2-ene-2-carboxylic acid, sodium salt To an ice-cold solution of 272 mg. of 7-amino-3-(acetoxymethyl) - 8 - oxo - 5 - thia - 1 - azabicyclo[4,2,0]oct-2-ene-2-carboxylic acid (7-aminocephalosporanic acid) and 0.3 ml. of triethylamine in 3 ml. of methylene dichloride there is added, dropwise, a solution of 355 mg. of 2-[α-chloro-α,α-bis(trifluoromethyl)-p-tolyoxy]acetyl chloride in 2 ml. of methylene dichloride. After one hour at 0°, the mixture is concentrated under reduced pressure and is then dissolved in 10 ml. of water. The pH is adjusted to 2.5 and the solution is then extracted with methyl isobutyl ketone. The methyl isobutyl ketone solution is washed with water, dried over anhydrous magnesium sulfate and is then treated with a solution of sodium 2-ethylhexoate in methyl isobutyl ketone. The sodium salt of 7-[2-[α-chloro-α,α-bis(trifluoromethyl) - p - tolyoxy]acetadimto] - 3 - (acetoxymethyl) - 8-oxo - 5-thia - 1-azabicyclo[4,2,0]oct-2-ene-2-carboxylic acid crystallizes and is recovered by filtration of the mixture.

EXAMPLE 3.—7-[2 - [α-CHLORO-α,α-BIS(TRIFLUOROMETHYL) - p-TOLYOXY]-ACETAMIDO] - 3- (HYDROXYMETHYL) - 8 - OXO - 5-THIA-1-AZABICYCLO[4,2,0]OCT - 2 - ENE - 2-CARBOXYLIC ACID, SODIUM SALT

To a solution of 2 grams of 7-[2-[α-chloro-α,α-bis(trifluoromethyl) - p-tolyoxy]-acetamido] - 3 - (acetoxymethyl) - 8-oxo - 5-thia - 1-azabicyclo [4,2,0]oct-2-ene-2-carboxylic acid, sodium salt in 5 ml. of water at 30°, there is added 10 ml. of orange peel (citrus) acetyl esterase solution (Jeffrey et al., Biochem. J. 81, 591 (1961), and the pH is maintained at 6.6 by the automatic addition of N/10 sodium hydroxide solution, the temperature being maintained at 30° during the addition. After about 0.9 equivalent of the sodium hydroxide solution has been added, the mixture is lyophilized to yield the crude 7 - [2-[α-chloro - α,α-bis(trifluoromethyl-p-tolyoxy]-acetamido] - 3 - (hydroxymethyl) - 8-oxo-5-thia - 1-azabicyclo[4,2,0]oct - 2-ene - 2-carboxylic acid sodium salt, which can be further purified by ion-exchange chromatography.

EXAMPLE 4.—7 - [2-[α-CHLORO-α,α-BIS(TRIFLUOROMETHYL) - p - TOLYOXY]-ACETAMIDO]-3 - (BENZOYLOXYMETHYL) - 8-OXO - 5-THIA-1-AZABICYCLO[4,3,0]OCT - 2-ENE-2-CARBOXYLIC ACID, SODIUM SALT

To a suspension of 1 gram of 7-[2-[α-chloro-α,α-bis(trifluoromethyl)-p-tolyoxy]-acetamido]-3-(hydroxymethyl)-8-oxo - 5-thia - 1-azabiiyclo[4,2,0]oct-2-ene-2-carboxylic acid, sodium salt in 5 ml. of anhydrous dimethylformamide, there is added 0.04 gram of benzoyl chloride and the mixture is stirred for 16 hours at room temperature. The mixture is then concentrated under reduced pressure and the residue, after extraction with ether, is dissolved in a pyridine-acetate buffer at pH 5.0. This solution is chromatographed on an Amberlite XE–58 (120–200 mesh acetate form) columns. Elution with pyridine-acetate buffer first yields a lactonic by-product. Subsequent fractions contain the desired product. These fractions are lyophilized and the residue redissolved in water. Acidification to pH 2.2 followed by extraction with methyl isobutyl ketone and treatment of the dried methyl isobutyl ketone solution with a sodium 2-ethylhexoate solution in methyl isobutyl ketone yields the desired sodium salt.

EXAMPLE 5.—7 - [2-[α-CHLORO - α,α-BIS(TRIFLUOROMETHYL) - p - TOLYLOXY]ACETAMIDO]-3-(PHENYLACETOXYMETHYL) - 8-OXO - 5-THIA-1 - AZABICYCLO[4,2,0]OCT - 2 - ENE - 2-CARBOXYLIC ACID, SODIUM SALT

Following the procedure of Example 4, but substituting an equivalent amount of phenylacetyl chloride for the benzoyl chloride yields the desired product.

EXAMPLE 6.—LACTONE OF 7 - [2 - [α - CHLORO-α,α - BIS(TRIFLUOROMETHYL) - p - TOLYLOXY] ACETAMIDO] - 3 - (HYDROXYMETHYL)-8-OXO-5 - THIA - 1 - AZABICYCLO[4,2,0]OCT-2-ENE-2-CARBOXYLIC ACID

Following the procedure of Example 2, step (b), but substituting the lactone of 7-amino-3-(hydroxymethyl)-8-oxo-5-thia-1-azabicyclo[4,2,0]oct-2-ene-2-carboxylic acid, for the 7-aminocephalosporanic acid, the desired product is obtained.

EXAMPLE 7.—7 - [2 - [α - CHLORO - α,α - BIS(TRIFLUOROMETHYL) - p - TOLYLOXY]ACETAMIDO]-3-METHYL-8-OXO - 5 - THIA - 1 - AZABICYCLO[4,2,0]OCT-2-ENE - 2 - CARBOXYLIC ACID, SODIUM SALT

Following the procedure of Example 2, step (b), but substituting 7 - amino-3-methyl-8-oxo-5-thia-1-azabicyclo-[4,2,0]oct-2-ene-2-carboxylic acid for the 7-aminocephalosporanic acid, the desired product is obtained.

EXAMPLE 8.—7 - [2 - [α - CHLORO - α,α - BIS(TRIFLUOROMETHYL) - p - TOLYLOXY]ACETAMIDO]-3-(ACETOXYMETHYL)-8-OXO - 5 - THIA-1-AZABICYCLO[4,2,0]OCT - 2 - ENE - 2 - CARBOXYLIC ACID

A solution of 50 mg. of 7-[2-[α-chloro-α,α-bis(trifluoromethyl)-p-tolyloxy]acetamido] - 3 - (acetoxymethyl)-8-oxo-5-thia-1-azobicyclo[4,2,0]oct-2-ene-2-carboxylic acid, sodium salt in three ml. of water is acidified to pH 2.2 by the addition of 0.1 N hydrochloric acid and is then thoroughly extracted with ethyl acetate. The ethyl acetate extracts are washed with water, dried over anhydrous magnesium sulfate and concentrated under reduced pressure to yield the desired product.

EXAMPLE 9.—[α,α - BIS(TRIFLUOROMETHYL)-p-TOLYLOXY]METHYLPENICILLIN, POTASSIUM SALT

Following the procedure of Example 1, but substituting p-amino-α,α-bis(heptafluoropropyl)benzyl alcohol for the α,α-bis(trifluoromethyl)benzyl alcohol in step (a), the desired product is formed.

EXAMPLE 10.—[α - HYDROXY - α,α - BIS(PENTAFLUOROETHYL) - p - TOLYLOXY]METHYLPENICILLIN, POTASSIUM SALT

Following the procedure of Example 1, but substituting decafluoro-3-pentanone for the hexafluoroacetone in step (a), the desired product is formed.

EXAMPLE 11.—[α - HYDROXY - α - (TRIFLUOROMETHYL) - α - (PENTAFLUOROETHYL) - p - TOLYLOXY]METHYLPENICILLIN, POTASSIUM SALT

Following the procedure of Example 1, but substituting octafluoro-2-butanone for the hexafluoroacetone in step (a), the desired product is formed.

EXAMPLE 12.—[α-HYDROXY-α,α-BIS(TRIFLUOROMETHYL) - o - TOLYLOXY]METHYLPENICILLIN, POTASSIUM SALT

Following the procedure of Example 1, but substituting o-amino-α,α-bis(trifluoromethyl)benzyl alcohol for the p-amino-α,α-bis(trifluoromethyl)benzyl alcohol in step (b), the desired product is formed.

EXAMPLE 13.—[α - HYDROXY - α,α - BIS(HEPTAFLUOROPROPYL) - p - TOLYLOXY]METHYLPENICILLIN, SODIUM SALT

Following the procedure of Example 1, but substituting p-amino-α,α-bis(heptafluoropropyl)benzyl alcohol for the benzyl alcohol compound in step (a), and sodium 2-ethylhexanoate for the potassium 2-ethylhexanoate in step (d), the desired product is formed.

EXAMPLE 14.—α - [α - HYDROXY - α,α - BIS(TRIFLUOROMETHYL) - p - TOLYLOXY]ETHYLPENICILLIN, POTASSIUM SALT

Following the procedure of Example 1, but substituting α-bromopropionic acid for the bromoacetic acid in step (c), the desired product is formed.

EXAMPLE 15.—[α - HYDROXY-α,α-BIS(TRIFUOROMETHYL) - p - TOLYLOXY]METHYLPENICILLIN, POTASSIUM SALT

A solution of [[α-hydroxy-α,α-bis(trifluoromethyl)-p-tolyloxy]methyl]penicillin, potassium salt in water is cooled to 5°, ether added and the pH of the stirred mixture adjusted to 2.2 by the addition of 20% phosphoric acid. The ether layer is separated, washed with water, dried over anhydrous magnesium sulfate and then concentrated to dryness under reduced pressure to yield the desired acid.

EXAMPLE 16.—1-[7-[2-[α-CHLORO - α,α - BIS(TRIFLUOROMETHYL) - p - TOLYLOXY]ACETAMIDO]-2-CARBOXY - 8 - OXO-5-THIA-1-AZABICYCLO[4,2,0]OCT - 2 - ENE - 3 - YL]METHYL]PYRIDINIUM HYDROXIDE, INNER SALT

A solution of 100 mg. of 7-[2-[α-chloro-α,α-bis(trifluoromethyl) - p - tolyloxy]acetamido]-3-acetoxymethyl-8-oxo-5-thia-1-azobicyclo[4,2,0]oct-2-ene - 2 - carboxylic acid in ten ml. of water is treated with 0.8 ml. of pyridine. The solution is kept at 37° C. for forty-eight hours and is then lyophilized. The residue is washed with acetone, dissolved in water and added to a column containing an anion exchange resin. The resin retains the unreacted starting material and the desired product is eluted with water. The solution of the desired 1-[[7-[2-[α-chloro-α,α-bis(trifluoromethyl) - p - tolyloxy]acetamido]-2-carboxy-8-oxo-5-thia-1-azabicyclo[4,2,0]oct - 2 - en-3-yl]methyl]pyridinium hydroxide, inner salt is lyophilized and the solid triturated with acetone to yield the desired product.

The invention may be variously otherwise embodied within the scope of the appended claims.

What is claimed is:

1. A compound of the formula

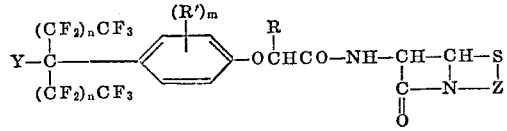

wherein R is selected from the group consisting of hydrogen and lower alkyl, R' is lower alkyl, Y is selected from the group consisting of hydrogen, hydroxy and halogen, m and n are each selected from the group consisting of zero, one and two, and Z is selected from the group consisting of

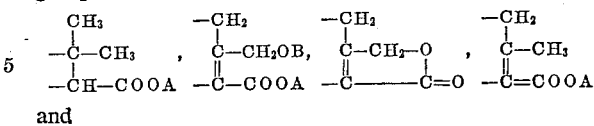

and

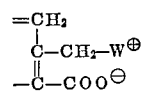

wherein A is selected from the group consisting of hydrogen and a pharmaceutically acceptable cation, B is selected from the group consisting of hydrogen, lower alkanoyl, benzoyl and phenyl(lower alkanoyl), and W is pyridinium.

2. [α - Hydroxy - α,α - bis(perfluoroalkyl)tolyloxy]methylpenicillin.

3. A pharmaceutically acceptable salt of the compound of claim 2.

4. [α - Hydroxy - α,α - bis(trifluoromethyl)-p-tolyloxy]methylpenicillin.

5. A pharmaceutically acceptable salt of the compound of claim 4.

6. An alkali metal salt of the compound of claim 4.

7. 7-[2 - [α - halo - α,α - bis(perfluoro)tolyloxy]acetamido] - 3 - (acetoxymethyl) - 8 - oxo - 5 - thia-1-azabicyclo[4,2,0]oct-2-ene-2-carboxylic acid.

8. A pharmaceutically acceptable salt of the compound of claim 7.

9. 7 - [2 - [α - chloro-α,α-bis(trifluoromethyl)-p-toyyloxy]acetamido] - 3 - (acetoxymethyl) - 8 - oxo-5-thia-1-azabicyclo[4,2,0]oct-2-ene-2-carboxylic acid.

10. A pharmaceutically acceptable salt of the compound of claim 9.

11. An alkali metal salt of the compound of claim 9.

12. A process for preparing a compound of the formula

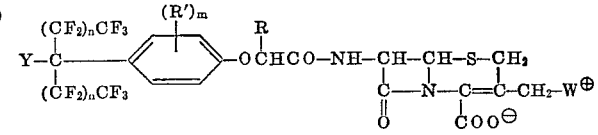

wherein R, R', Y, m, n and W are as defined in claim 1, which comprises interacting a compound of the formula

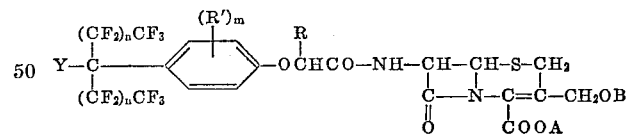

wherein R, R', Y, m, n, A and B are as defined in claim 1, with pyridine.

References Cited
FOREIGN PATENTS
698,111  11/1964  Canada.

NICHOLAS S. RIZZO, *Primary Examiner.*
DONALD G. DAUS, *Assistant Examiner.*

UNITED STATES PATENT OFFICE
CERTIFICATE OF CORRECTION

Patent No. 3,396,159                                                      August 6, 1968

Jack Bernstein et al.

It is certified that error appears in the above identified patent and that said Letters Patent are hereby corrected as shown below:

Column 2, line 20, "posses" should read -- possess --. Column 3, line 29, "theretof" should read -- thereof --. Colu 5, line 23, "solt" should read -- salt --; line 25, "acetadimt should read -- acetamido --. Column 8, lines 8 to 11, the formula should appear as shown below:

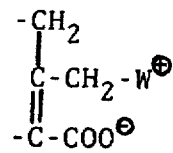

Signed and sealed this 10th day of February 1970.

(SEAL)
Attest:

EDWARD M. FLETCHER, JR.
Attesting Officer

WILLIAM E. SCHUYLER, JR
Commissioner of Patents